2 Sheets--Sheet 1.
S. M. YORK.
Drawing-Protractors, Sliding T Squares, &c.
No. 154,976. Patented Sept. 15, 1874.
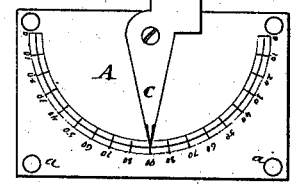
Fig. 1.
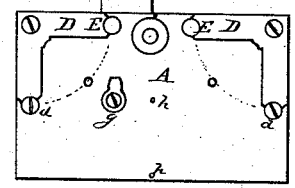
Fig. 2.
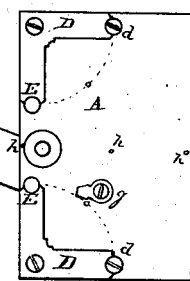
Fig. 3.
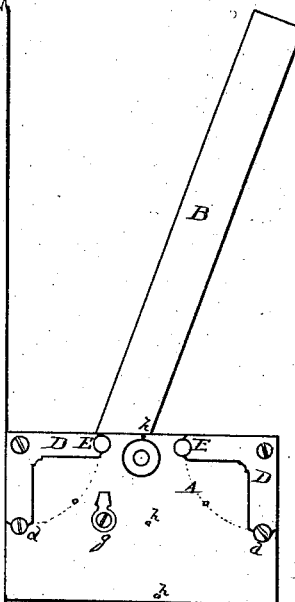
Witnesses.
Geo. W. Tibbitts
Jas. Mahon
Inventor.
S. Milton York

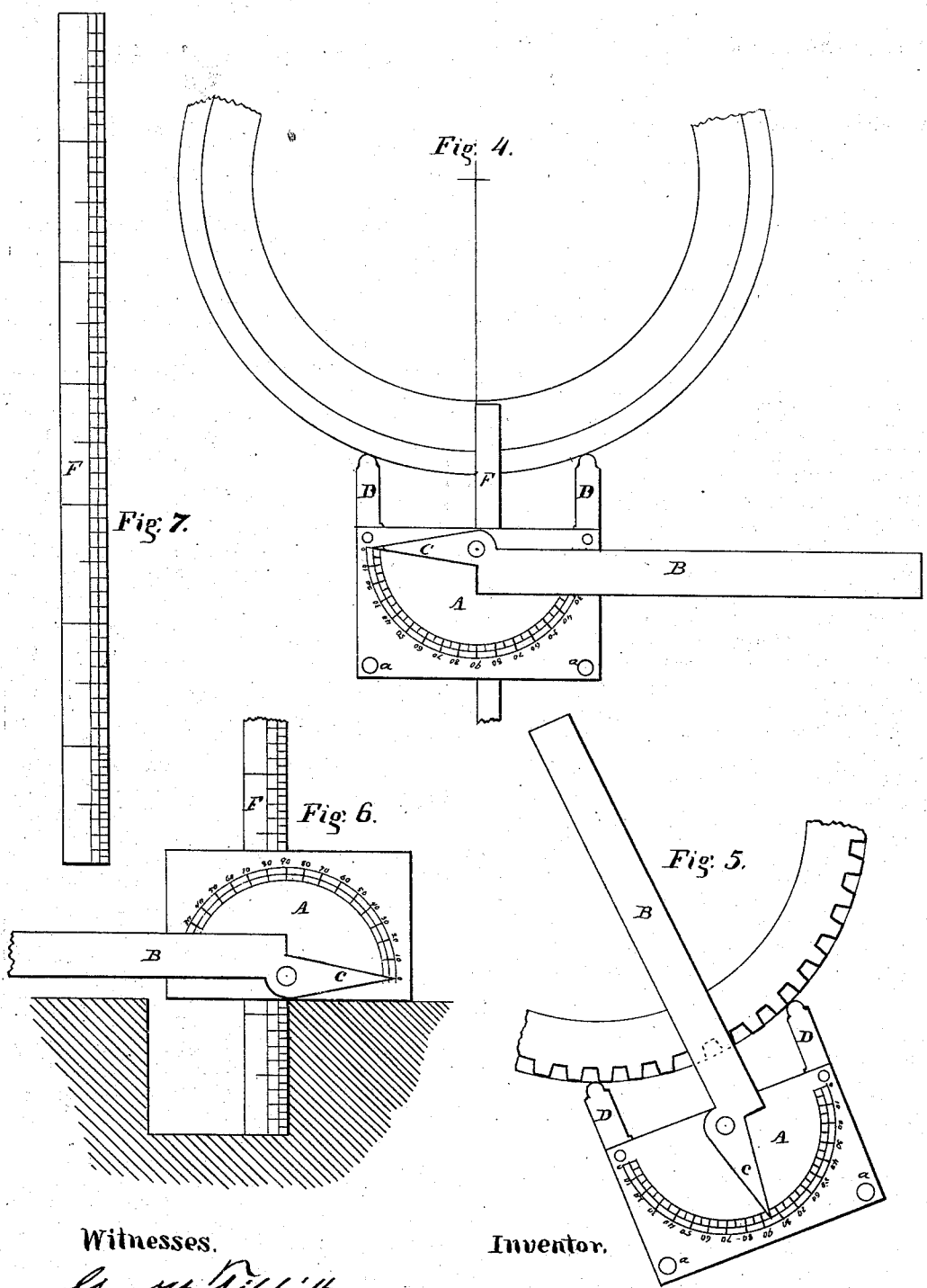

UNITED STATES PATENT OFFICE.

S. MILTON YORK, OF TOLEDO, OHIO.

IMPROVEMENT IN DRAWING-PROTRACTORS, SLIDING T-SQUARES, &c.

Specification forming part of Letters Patent No. 154,976, dated September 15, 1874; application filed January 24, 1874.

*To all whom it may concern:*

Be it known that I, S. MILTON YORK, of the city of Toledo, in the county of Lucas and State of Ohio, have invented an Improved Combined Drawing-Protractor, Sliding T-Square, Universal Bevel, and Center-Square, of which the following is a specification:

This invention relates to the combination, in a compact form, of the above-named instruments; and consists in certain details of construction and arrangement of the several parts, as hereinafter described.

To fully understand the invention, I will proceed to describe the same in detail with the aid of the accompanying drawings.

Figure 1, Sheet 1, is a view of the protractor-scale side of the instrument. Fig. 2, Sheet 1, is a reverse side of the instrument. Fig. 3, Sheet 1, is a view of the instrument as used in connection with an ordinary T-square. Fig. 4, Sheet 2, is a view of the instrument as used for a centering-square on circular-edged surfaces. Fig. 5, Sheet 2, is a view of the instrument as seen used for laying off the bevel for cog-wheels. Fig. 6, Sheet 2, shows the use of the instrument for taking the depth of an opening, or the depth or bevel of a space between two bodies. The instrument is also adapted to taking beveled edges. Fig. 7 is a detached view of the sliding tongue.

Like letters of reference indicate like parts in the several figures.

A is a base-piece of equal thickness throughout, and is in form a rectangular parallelogram, though the form may be varied to a right-angled triangle, or a regular triangle. On one face of said base A, as seen in Fig. 1, is made a protractor-scale. On the same side, also, is pivoted the tongue B, at the center of the protractor-scale, having a pointer, C. One side of said tongue is on a line with the center of the protractor and the point C. The sides of the tongue B are parallel. Short feet *a a* are placed at the two lower corners of the base A, of equal thickness with the tongue. On the reverse side of the base-piece A are two right-angled arms, D D, pivoted, at their angle, to the corners of the base, on the same edge with the tongue. The said arms have attached at their inner ends pins E E, perpendicular to the face of the plate A. Their use will be hereinafter shown. The other ends of said arms D D are provided with set-screws *d d* for securing them in positions, the plate having holes or stops for that purpose. F is a detachable sliding tongue, which can be secured to the same side of the plate A by a button, *g*, at one side, the other side of the said tongue lying against short pins *h h*, and on a line with the center of the plate, the same as the tongue B.

The following is a description of the various uses this instrument is applicable to, which heretofore required separate instruments to perform: First, as in Fig. 1, when used for a protractor from the edge of a drawing-board or straight-edge. Second, in Fig. 2, the instrument inverted may be used on plain surfaces for drawing angles or other straight forms. Third, Fig. 3 shows its use in connection with the tongue of an ordinary T-square for obtaining angles from a perpendicular line, and for readily describing the same angle on the opposite side of said perpendicular line. Either edge of said base A may be applied to the T-square. Fourth, in Fig. 4 is shown the use of the instrument in drawing lines on the ends of cylindrical bodies, perpendicular to their centers. The arms D D are here extended, and the pins E E bear against the circumference and ride thereon. The sliding tongue is here seen adjustable to accommodate it to a narrow surface or shoulder, as on a shaft. Fifth, in Fig. 5 is seen the instrument adapted to laying off cogs on wheels, the said arms D D extended, and the pins E E riding on the circumference. It will be seen this leaves the edge of the tongue unobstructed for drawing any line throughout its length, and the tongue is easily adjusted for describing the required bevel. Sixth, in Fig. 6 is seen the use of the instrument for taking and squaring the depth and sides of an opening.

Having described my invention, I claim—

1. In a protractor, A B, the combination of the pivoted arms D D, carrying the pins E E, made adjustable in position by the set-screws *d d*, or their equivalents, as and for the purpose set forth.

2. The protractor A B, whose base A is provided with the pivoted arms D D, pins E E, and a sliding tongue, F, as and for the purpose described.

Witnesses: S. MILTON YORK.
GEO. W. TIBBITTS,
M. ROGERS.